(12) United States Patent
Hochstetler et al.

(10) Patent No.: US 9,422,979 B2
(45) Date of Patent: Aug. 23, 2016

(54) STANDPIPE ASSEMBLY

(71) Applicant: Hamilton Sundstrand Corporation, Windsor Locks, CT (US)

(72) Inventors: Derek R. Hochstetler, Loves Park, IL (US); Jan Henry Abels, Rockford, IL (US); Timothy R. Welch, Roscoe, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 219 days.

(21) Appl. No.: 13/862,664

(22) Filed: Apr. 15, 2013

(65) Prior Publication Data

US 2014/0306564 A1 Oct. 16, 2014

(51) Int. Cl.
| | |
|---|---|
| *H02K 5/22* | (2006.01) |
| *H02K 5/16* | (2006.01) |
| *F16C 33/10* | (2006.01) |
| *H02K 7/18* | (2006.01) |
| *H02K 7/08* | (2006.01) |
| *F16H 57/04* | (2010.01) |

(52) U.S. Cl.
CPC .............. *F16C 33/1045* (2013.01); *H02K 5/16* (2013.01); *H02K 5/22* (2013.01); *F16H 57/0408* (2013.01); *H02K 7/08* (2013.01); *H02K 7/1823* (2013.01); *Y10T 29/4978* (2015.01)

(58) Field of Classification Search
CPC .............. H02K 5/00; H02K 9/00; H02K 5/16; H02K 5/22; H02K 7/08; H02K 7/1823; F16N 33/00; F01M 11/04; F01M 11/0408; F01M 11/0458; F01M 11/0466; F01M 11/12; F16H 57/0408; F16C 33/1045; Y10T 29/4978
USPC .......... 310/52, 90; 184/103.1, 1.5; 415/168.1; 141/86
See application file for complete search history.

(56) References Cited

U.S. PATENT DOCUMENTS

| | | | |
|---|---|---|---|
| 2,240,607 A | 5/1941 | Buck | |
| 2,550,001 A * | 4/1951 | Button | ............................ 248/49 |
| 3,662,858 A * | 5/1972 | Peterson | .................... 184/103.1 |
| 4,150,714 A | 4/1979 | Atkins et al. | |
| 4,200,143 A | 4/1980 | Matter et al. | |
| 4,492,481 A | 1/1985 | Shore | |
| 4,583,416 A * | 4/1986 | Muller | ............................ 74/467 |
| 4,696,618 A | 9/1987 | Fairchild et al. | |
| 4,932,446 A | 6/1990 | Behling | |
| 5,072,145 A * | 12/1991 | Davis et al. | ...................... 310/54 |
| 5,176,174 A * | 1/1993 | Toraason et al. | .............. 137/590 |
| 5,289,697 A * | 3/1994 | Hutchison | ........................ 62/474 |
| 5,351,913 A | 10/1994 | Cycon et al. | |
| 6,886,608 B2 * | 5/2005 | Jacob | ............................... 141/86 |
| 7,014,419 B2 | 3/2006 | Farnsworth et al. | |
| 7,367,427 B2 | 5/2008 | Gaines et al. | |
| 7,531,090 B1 * | 5/2009 | Stamey et al. | ................. 210/234 |

(Continued)

OTHER PUBLICATIONS

The European Search Report mailed Aug. 6, 2015 for European Application No. 14163672.0.

*Primary Examiner* — Terrance Kenerly
*Assistant Examiner* — Alexander Singh
(74) *Attorney, Agent, or Firm* — Kinney & Lange, P.A.

(57) ABSTRACT

A standpipe assembly to connect to a starter/generator housing includes a standpipe with a first end that sits within the housing and a second end that connects to the standpipe base; and one or more brackets to secure the standpipe to the housing. The housing includes a standpipe base formed integral to the housing.

12 Claims, 5 Drawing Sheets

(56) References Cited

U.S. PATENT DOCUMENTS

| | | |
|---|---|---|
| 2004/0226774 A1* | 11/2004 | Gunderson et al. .......... 184/1.5 |
| 2005/0178715 A1* | 8/2005 | Thomas et al. ............... 210/437 |
| 2008/0181770 A1* | 7/2008 | Russell ..................... 415/182.1 |
| 2012/0097482 A1 | 4/2012 | Miller et al. |

* cited by examiner

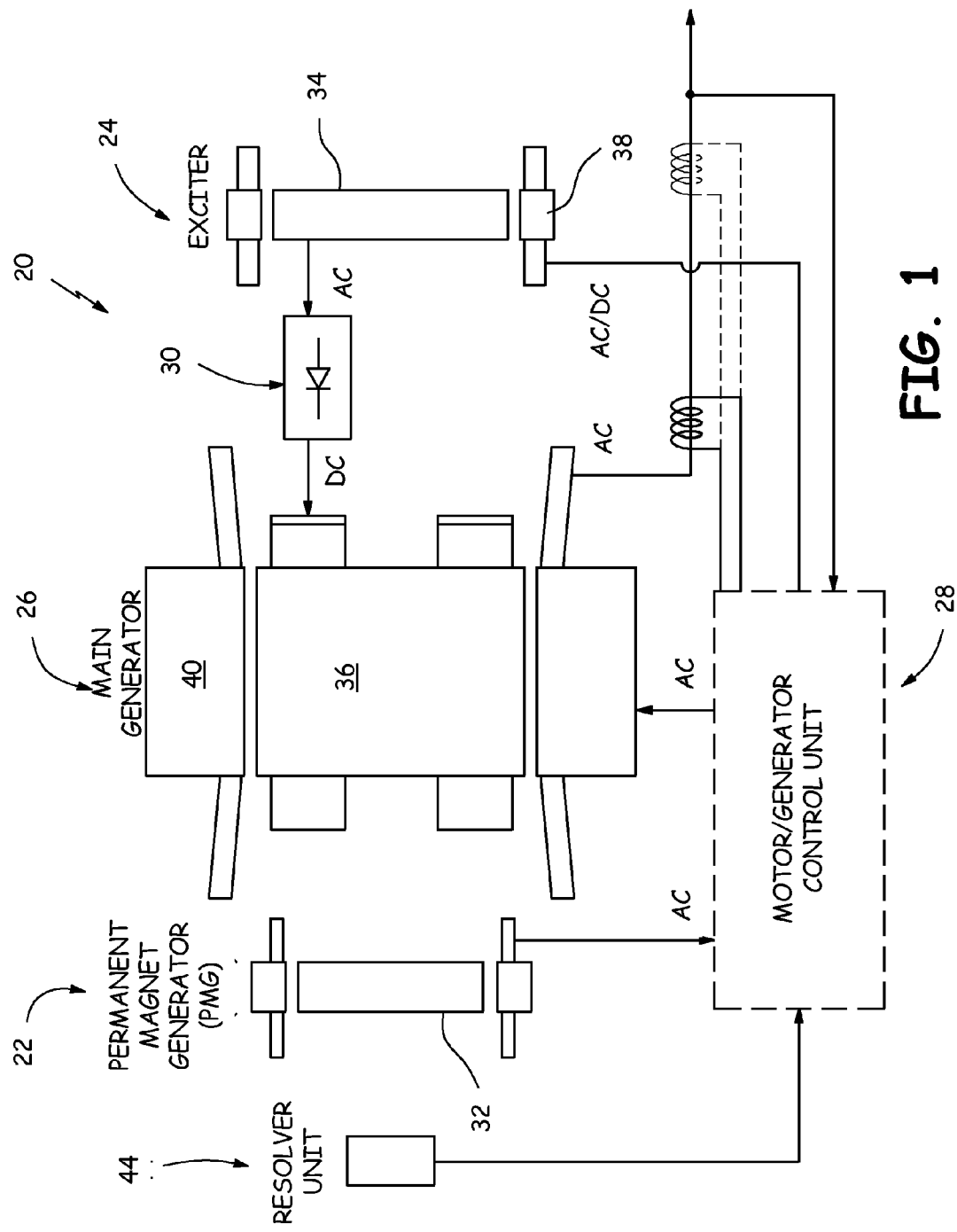

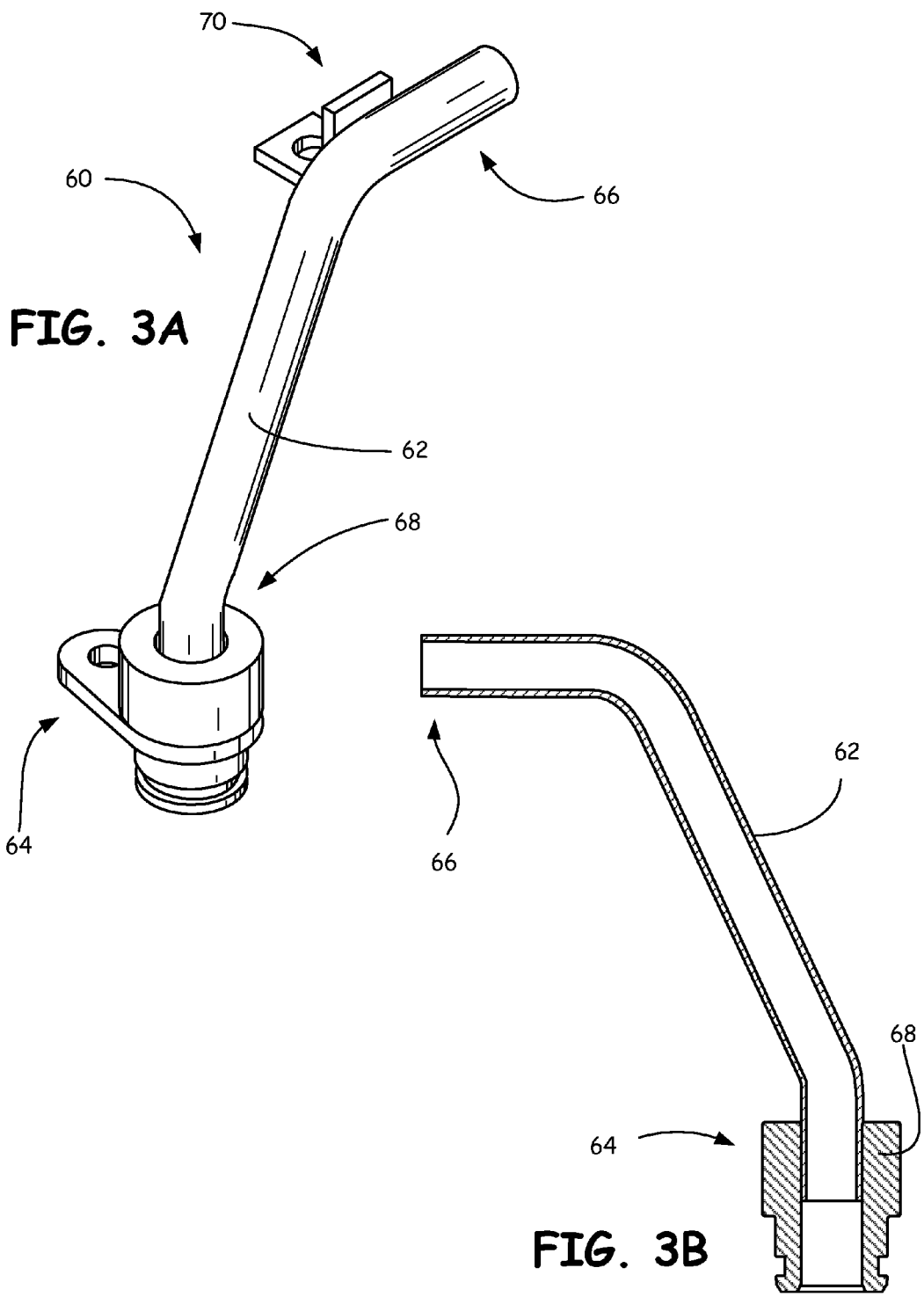

STANDPIPE ASSEMBLY

BACKGROUND

The present disclosure relates to rotating electrical machines such as high speed starter/generators for gas turbine engines and, more particularly, to a standpipe assembly for a starter/generator.

An aircraft may include various types of rotating electrical machines such as, for example, generators, motors, and starter/generators. Starter/generators may be operated as either a starter or a generator.

The starter/generator is enclosed within a housing. The housing contains starter/generator components and lubricating fluid to lubricate starter/generator components. Oil level is controlled by a standpipe assembly, which is typically formed integral to the housing. When preparing to start or service a starter/generator, lubricating fluid is poured into the housing. Once lubricating fluid has reached the level of the top of the standpipe assembly, the lubricating fluid starts to drain through the standpipe assembly, indicating that the starter/generator is ready for operation.

SUMMARY

A standpipe assembly to connect to a starter/generator housing includes a standpipe with a first end that sits within the housing and a second end that connects to the standpipe base; and one or more brackets to secure the standpipe to the housing. The housing includes a standpipe base formed integral to the housing.

A method of installing a standpipe assembly in a starter/generator with a housing includes aligning a standpipe assembly within the housing so that the standpipe assembly is oriented to drain oil through the standpipe when oil in the housing reaches a certain level and connecting an end of a standpipe assembly to a receiving portion of the housing. The receiving portion of the housing has a passage to drain oil from the standpipe out of the housing. The method further includes securing the standpipe assembly to the housing.

BRIEF DESCRIPTION OF THE DRAWINGS

FIG. 1 is a functional schematic block diagram of a synchronous starter/generator system.

FIG. 3A is a perspective view of the standpipe assembly.

FIG. 3B is a cross-sectional view of the standpipe assembly.

DETAILED DESCRIPTION

Figure 2A:
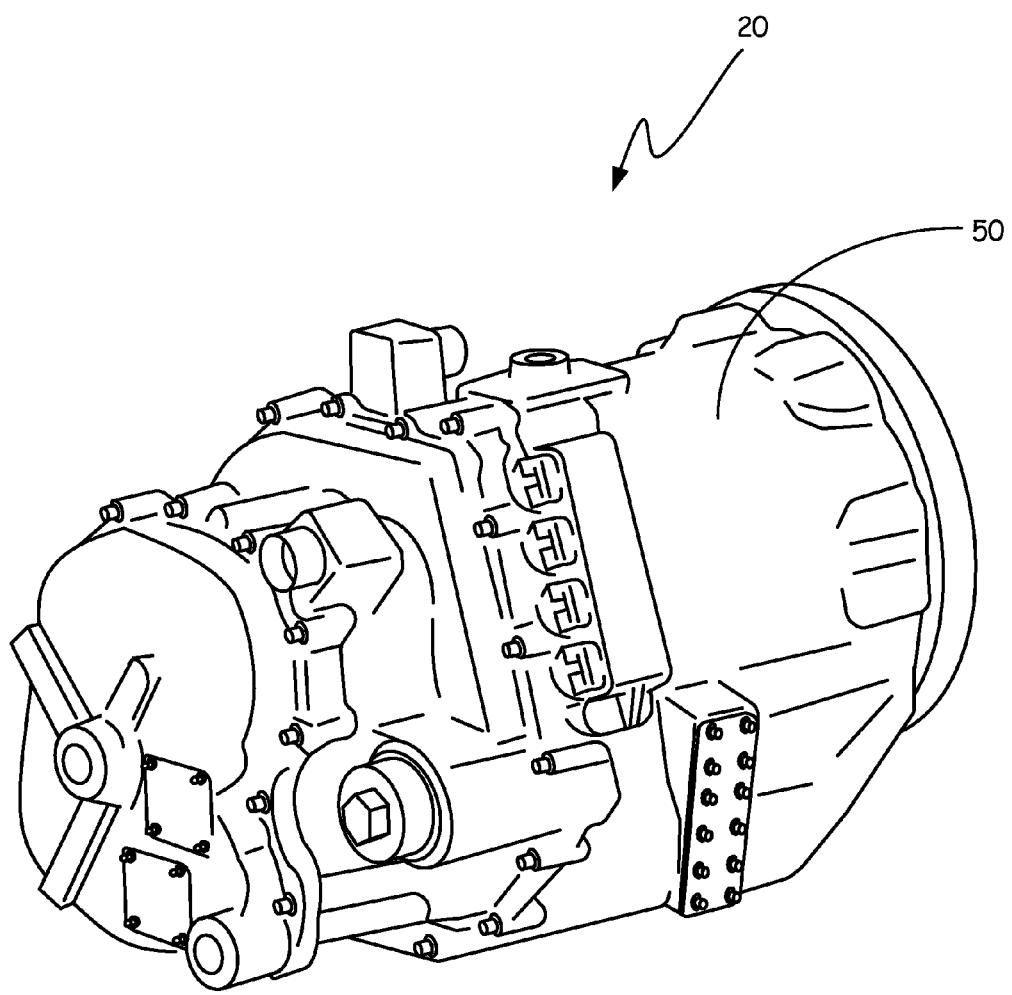
FIG. 2A is a perspective view of a starter/generator.

FIG. 1 schematically illustrates a functional block diagram of one embodiment of a starter/generator system 20. This starter/generator system 20, which is commonly known as a brushless AC starter/generator, includes a permanent magnet generator (PMG) 22, an exciter 24, a main/generator 26, a starter/generator control unit 28, and one or more rectifiers 30. The starter/generator system 20 may be used as a starter/generator for a gas turbine engine in aircraft, space, marine, land or other vehicle-related applications where gas turbine engines are used. For aircraft applications, gas turbine engines are used for propulsion (e.g., the aircraft's main engines) and/or for power (e.g., the auxiliary power unit (APU)). It is to be appreciated, however, that the present invention is not limited to use in conjunction with a specific type of electrical machine. Thus, although the present invention is, for convenience of explanation, depicted and described as being implemented in a starter/generator, it will be appreciated that it can be implemented in other electric machines.

When the starter/generator system 20 is operating as a generator, a rotor 32 of the PMG 22, a rotor 34 of the exciter 24, and a rotor 36 of the main starter/generator 26 all rotate. As the PMG rotor 32 rotates, the PMG 22 generates and supplies AC power to the starter/generator control unit 28, which in turn supplies direct current (DC) power to a stator 38 of the exciter 24. The exciter rotor 34 in turn supplies AC power to the rectifier 30. The output from the rectifier 30 is DC power and is supplied to the main starter/generator rotor 36, which in turn outputs AC power from a main starter/generator stator 40. The starter/generator system 20 may supply output power at a variety of frequencies, or alternatively, a gearing system may be used to operate the starter/generator at a constant speed and, thus, supply a constant frequency. The output power from the main starter/generator stator 40 is typically three-phase AC power.

When the starter/generator system 20 is in operation as a starter motor, AC power is supplied to the exciter stator 38 and the main starter/generator stator 40 from, for example, an AC power supply section in the starter/generator control unit 28 to cause the main starter/generator rotor 36 to rotate. As the main starter/generator rotor 36 rotates, the PMG rotor 32 and exciter rotor 34 also rotate. A position sensing device, such as a resolver 44, may also be included in the starter/generator system 20 to supply a signal representative of the main starter/generator rotor 36 position to the starter/generator control unit 28. This position signal is used to control the AC power supplied to the main starter/generator stator 40 and to the exciter 24 such that the maximum torque is generated.

Figure 2B:
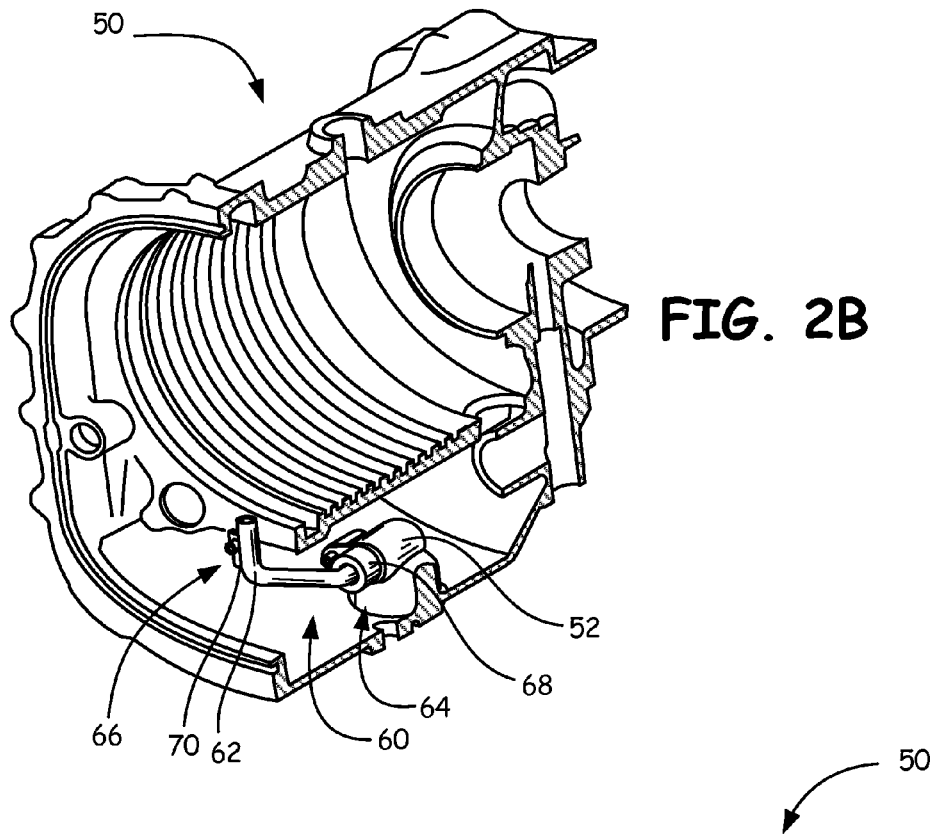
FIG. 2B is a perspective view of the starter/generator with a portion of the starter-generator housing cut away for viewing a standpipe assembly.
Figure 2C:
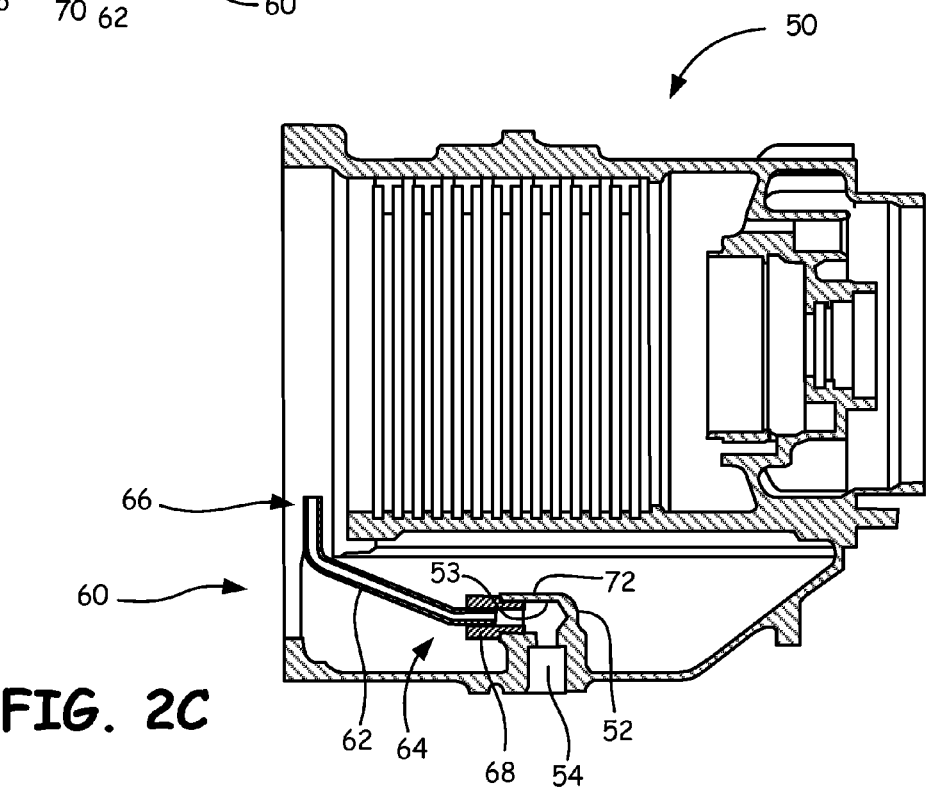
FIG. 2C is a cross-sectional view of the starter/generator housing.
Figure 2D:
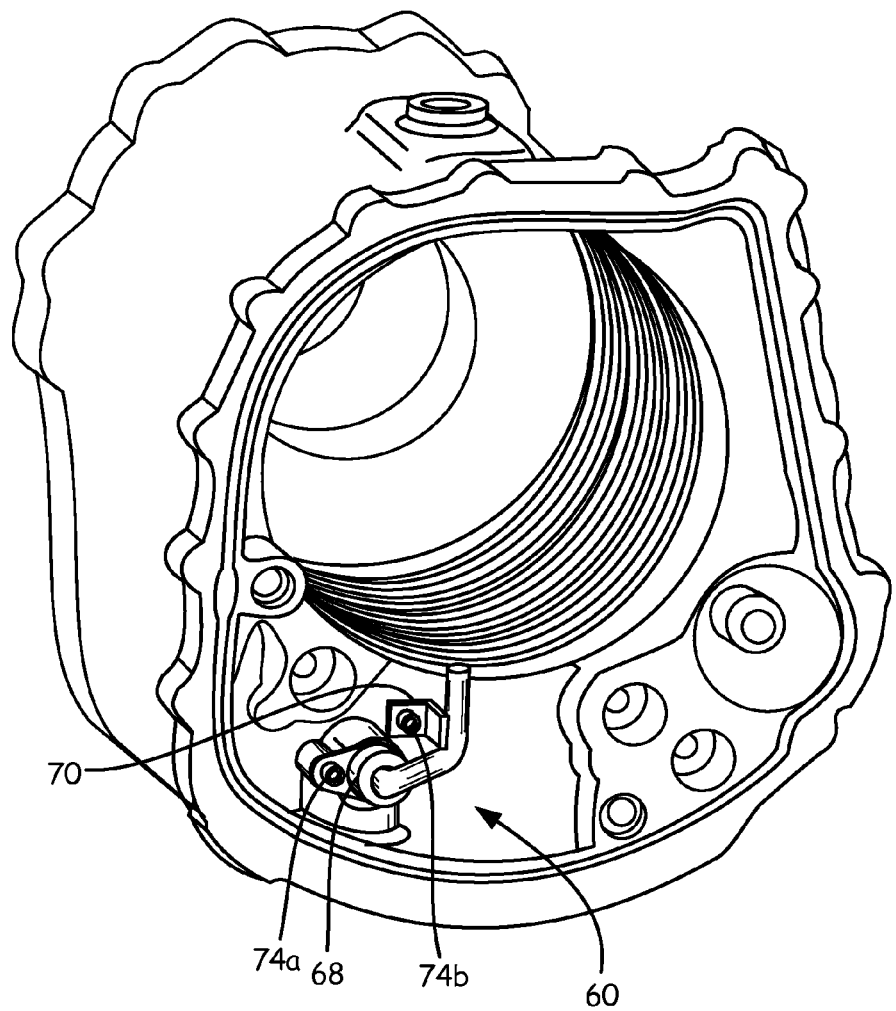
FIG. 2D is a perspective end view of the starter/generator housing.

FIG. 2A is a perspective view of starter/generator 20. FIG. 2B is a perspective view of starter/generator 20 housing 50 with a portion of housing 50 cut away for viewing standpipe assembly 60. FIG. 2C is a cross-sectional view of the starter/generator 20 housing 50 with standpipe assembly 60, and FIG. 2D is a perspective end view of the starter/generator housing and standpipe assembly 60. FIGS. 2B-2D show housing 50 with internal starter/generator components removed for viewing purposes only.

FIGS. 2A-2D include starter/generator 20 housing 50 with standpipe assembly base 52 and standpipe assembly 60. Standpipe assembly base 52 can be formed integral to housing 50 and includes aperture 53 to receive standpipe assembly 60 and passage 54. Standpipe assembly 60 includes standpipe 62 with first end 66 and second end 64, base bracket 68, side bracket 70, seal 72 and fasteners 74a, 74b. Fasteners 74a, 74b can be, for example, bolts. Seal 72 can be an O-ring seal. Standpipe 62 can be made out of a metallic material, for example aluminum (including alloys) or other materials depending on system requirements.

Base bracket 68 and side bracket 70 can be connected to standpipe 62 through welding. In other embodiments, standpipe 62 and brackets 68, 70 can be formed integral. Base bracket 68 fits into standpipe assembly base 52 at aperture 53, forming a flow passage from first end 66 of standpipe 62 through passage 54 of standpipe assembly base 52 and out of housing 50. Base bracket 68 further secures standpipe 62 to housing 50 with fastener 74a connecting base bracket 68 to housing 50 and fastener 74b connecting side bracket 70 to housing 50. Seal 72 seals the connection between standpipe base 52 and standpipe assembly 60 to ensure there is no leakage.

When servicing starter/generator 20 or preparing starter/generator 20 for operation, oil is poured into housing 50. Oil collects at the bottom of housing 50, and once it has reached the top of first end 66 of standpipe 62, oil will enter standpipe 62 first end 66 and drain out of standpipe assembly 60 through passage 54, no longer filling housing 50. This indicates filling or servicing is done. It is essential to have a certain amount of oil in starter/generator 20 for proper operation. Oil level variation increases the required maintenance of starter/generator.

Standpipe assembly 60 formed separately from housing 50 allows standpipe assembly 60 to be positioned to maintain proper oil levels no matter the orientation of starter/generator 20. In past systems, standpipe assembly was formed integral to housing 50 and machined to a certain level. This meant that if starter/generator were tilted, as in some applications, for example, in particular aero applications, oil levels would not remain constant and would drain more or less according to the tilt and orientation of starter/generator 20. The disclosed configuration eliminates this drawback.

Standpipe assembly 60 is formed separately from housing 50, allowing standpipe assembly 60 to be positioned with tilt or mounting orientation factored in so that desired oil levels are maintained. Forming standpipe assembly 60 separately from housing 50 and connecting standpipe assembly 60 to housing 50 helps to maintain a stable, repeatable oil level while allowing for more variation on mounting orientation starter/generator 20. Additionally, it allows for a more flexible system where standpipe assembly 60 can be positioned wherever there is room in starter/generator, and allowing for the first end 66 to be placed a most desirable point in starter/generator 20 for maintaining constant oil levels. This ensures starter/generator 20 stays lubricated and running smoothly.

FIG. 3A is a perspective view of the standpipe assembly 60, and FIG. 3B is a cross-sectional view of the standpipe assembly 60. Standpipe assembly 60 includes standpipe 62 with first end 66 and second end 64, base bracket 68 and side bracket 70.

As described above, in the example shown, standpipe 62 is welded into base bracket 68 and extends at an angle from base bracket 68. Standpipe 62 then curves to have a horizontal orientation of first end 66, which will drain oil when it reaches that level within housing 50. Base bracket 68 and side bracket 70 connect to housing 50 with fasteners 74a, 74b to secure standpipe assembly 60 at desired orientation and level within housing 50 (See FIGS. 2A-2D).

The angle of curvature, orientation of first end 66, and placement and size of brackets 68, 70 are for example purposes only. In other embodiments standpipe could be oriented, sized and/or shaped differently. As standpipe if formed separately from housing, standpipe assembly 60 has a flexible design so that it can be formed and placed within housing 50 to guard against tilting or different mounting orientations of starter/generator 20. The shape, mounting and placement of standpipe assembly 60 can ensure that starter/generator stays properly lubricated, and thus properly functioning.

While standpipe assembly 60 is shown with two brackets 74a, 74b, this is for example purposes only and more or fewer brackets may be included to secure standpipe assembly 60 to housing 50.

It should be understood that like reference numerals identify corresponding or similar elements throughout several drawings. It should also be understood that although a particular component arrangement is disclosed in the illustrated embodiment, other arrangements will benefit therefrom.

Although particular step sequences are shown, described and claimed, it should be understood that steps may be performed in any order, separated or combined unless otherwise indicated and will still benefit from the present disclosure.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A standpipe assembly to connect to a starter/generator housing with a standpipe base integral to the housing, the standpipe assembly comprising:
   a standpipe aligned within the housing so that the standpipe is oriented to drain oil through the standpipe when oil in the housing reaches a threshold level, the standpipe having a first portion with a first end that sits within the housing and a second portion with a second end that connects to the standpipe base, wherein the first portion extends along a first direction, and wherein the second portion extends along a second direction that is different than the first direction; and
   one or more brackets to secure the standpipe to the housing, wherein the one or more brackets comprise:
      a first bracket comprising:
         a first aperture configured to receive the second end of the standpipe and secure around the second end of the standpipe to fit at least partially within the standpipe base in the housing; and
         a second aperture configured to receive a fastener for securing the first bracket to the housing; and
      a second bracket securing the standpipe to the housing.

2. The standpipe assembly of claim 1, wherein the first bracket and the second bracket are welded to the standpipe.

3. The standpipe assembly of claim 1, and further comprising:
   a seal connecting between the standpipe and the standpipe base.

4. The standpipe assembly of claim 1, wherein the standpipe is aluminum.

5. The standpipe assembly of claim 1,
   wherein the standpipe further comprises a third portion disposed between the first portion and the second portion;
   wherein the third portion extends along a third direction that is different than both the first direction and the second direction.

6. The standpipe assembly of claim 5, wherein the third direction forms an obtuse angle with each of the first direction and the second direction.

7. The standpipe assembly of claim 6, wherein the first direction and the second direction are orthogonal.

8. A starter/generator comprising:
   a housing surrounding the starter/generator, the housing with an integral standpipe assembly base that includes a first aperture and a passage to receive oil and allow the oil to flow out of the housing; and a standpipe assembly connected to and extending from the first aperture in the standpipe assembly base forming a flowpath from a first end of the standpipe assembly through the passage and out of the housing, wherein the standpipe assembly comprises a first portion with a first end that sits within the housing to receive the oil and a second portion with a second end to connect to the standpipe base to drain the oil into the passage in the standpipe assembly base, wherein the first portion extends along a first direction, and wherein the second portion extends along a second direction that is different than the first direction;

wherein the standpipe assembly further comprises:
a first connection piece secured to the second end to connect the standpipe to the first aperture in the standpipe assembly base, the first connection piece comprising a first bracket comprising:
a second aperture configured to receive the standpipe second end and secure around the standpipe second end; and
a third aperture configured to receive a first fastener for connecting the first bracket to the housing; and
a second connection piece to secure the standpipe to the housing, the second connection piece comprising a second bracket that secures to the side of the standpipe, and connects to the housing with a second fastener.

9. The starter/generator of claim 8, and further comprising a seal between the first connection piece and the standpipe assembly base.

10. The starter/generator of claim 8, wherein the first connection piece and the second connection piece are welded to the standpipe.

11. The starter/generator of claim 8, wherein the standpipe assembly is shaped and oriented to regulate oil levels within the housing so that a minimum oil level in the housing at all orientations of the starter/generator is maintained.

12. A method of installing a standpipe assembly having a standpipe in a starter/generator with a housing, the method comprising:
aligning the standpipe assembly within the housing so that the standpipe assembly is oriented to drain oil through the standpipe when oil in the housing reaches a certain level, wherein the standpipe comprises a first portion with a first end that sits within the housing and a second portion with a second end that connects to a receiving portion of the housing, the first end extending along a first direction, and the second portion extending along a second direction that is different than the first direction;
connecting the second end of the standpipe to the receiving portion of the housing, the receiving portion of the housing with a passage to drain oil from the standpipe out of the housing; and
securing the standpipe assembly to the housing, wherein securing the standpipe assembly to the housing comprises connecting one or more brackets of the standpipe assembly to the housing with one or more fasteners, the one or more brackets comprising:
a first bracket comprising:
a first aperture configured to receive the second end of the standpipe and connect around the second end of the standpipe in the standpipe assembly, the first bracket fitting at least partially inside the receiving portion of the housing; and
a second aperture configured to receive a fastener for securing the first bracket to the housing; and
a second bracket connecting to a side of the standpipe and to the housing.

\* \* \* \* \*